United States Patent
Nishiyama et al.

(10) Patent No.: US 10,173,551 B2
(45) Date of Patent: Jan. 8, 2019

(54) CONTROL APPARATUS

(71) Applicant: DENSO CORPORATION, Kariya, Aichi-pref. (JP)

(72) Inventors: Masaki Nishiyama, Kariya (JP); Hirofumi Yamashita, Kariya (JP)

(73) Assignee: DENSO CORPORATION, Kariya (JP)

( * ) Notice: Subject to any disclaimer, the term of this patent is extended or adjusted under 35 U.S.C. 154(b) by 381 days.

(21) Appl. No.: 14/926,346

(22) Filed: Oct. 29, 2015

(65) Prior Publication Data

US 2016/0121755 A1  May 5, 2016

(30) Foreign Application Priority Data

Oct. 29, 2014 (JP) .................. 2014-220116

(51) Int. Cl.
*B60L 15/20* (2006.01)
*B60L 11/04* (2006.01)

(52) U.S. Cl.
CPC ........... *B60L 15/2045* (2013.01); *B60L 11/04* (2013.01); *Y02T 10/7077* (2013.01); *Y02T 10/7275* (2013.01)

(58) Field of Classification Search
None
See application file for complete search history.

(56) References Cited

U.S. PATENT DOCUMENTS

| 2008/0315814 A1* | 12/2008 | Takizawa | B60L 15/00 318/434 |
| 2009/0227407 A1* | 9/2009 | Kamada | B60K 6/445 475/5 |
| 2013/0105241 A1* | 5/2013 | Christian | B60K 17/12 180/337 |

FOREIGN PATENT DOCUMENTS

| JP | H07-194094 A | 7/1995 |
| JP | 2008-054433 A | 3/2008 |
| JP | 2010-012907 A | 1/2010 |
| JP | 2011-259601 A | 12/2011 |
| JP | 2013-005590 A | 1/2013 |
| JP | 2013005590 A * | 1/2013 |
| JP | 2014-109290 A | 6/2014 |

\* cited by examiner

*Primary Examiner* — Shelley Chen
(74) *Attorney, Agent, or Firm* — Oliff PLC

(57) ABSTRACT

A control apparatus is provided in a rotary electric machine driving system that includes a rotary electric machine for a vehicle and a control unit that controls driving of the rotary electric machine. The apparatus includes a malfunction determination section determining whether or not a system malfunction that requires torque limitation has occurred, a to-be-avoided state determination section determining whether or not the vehicle is in a to-be-avoided state, a torque limitation section limiting an output torque outputted from the rotary electric machine to a limiting torque smaller than a command torque, when the system malfunction is determined to have occurred and the vehicle is not in the to-be-avoided state, and a torque limitation relaxation section permitting the output torque to be a limitation relaxation torque larger than the limiting torque, when the system malfunction is determined to have occurred and the vehicle is in the to-be-avoided state.

10 Claims, 8 Drawing Sheets

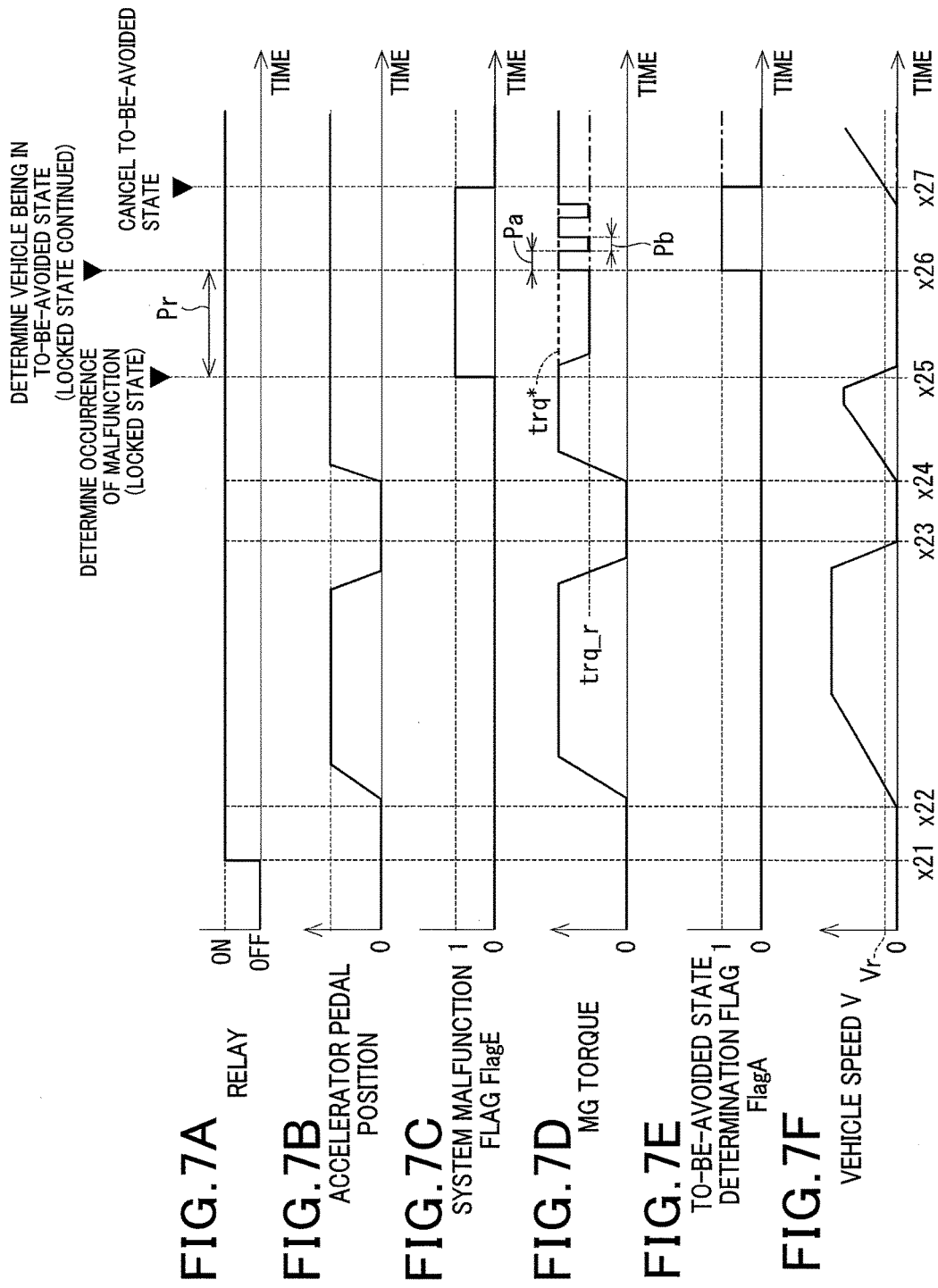

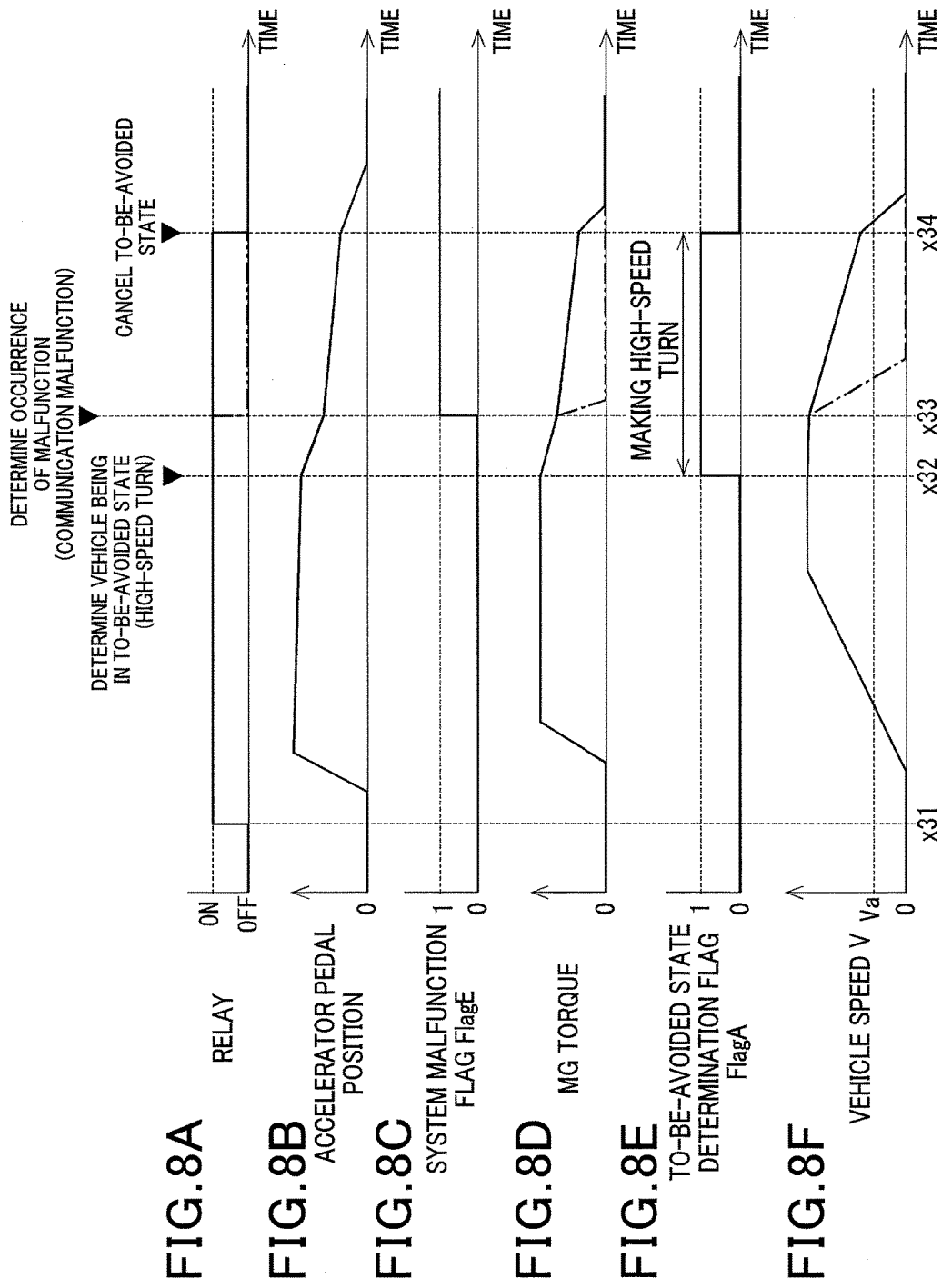

CONTROL APPARATUS

CROSS-REFERENCE TO RELATED APPLICATION

This application is based on and claims the benefit of priority from earlier Japanese Patent Application No. 2014-220116 filed Oct. 29, 2014, the description of which is incorporated herein by reference.

BACKGROUND

Technical Field

The present invention relates to a control apparatus of a rotary electric machine.

Related Art

Control apparatuses that control a power converter are known. The power converter controlled by such a control apparatus performs conversion for electric power to be supplied to a motor. For example, according to the disclosure of JP-A-H7-194094, when the temperature of an insulated gate bipolar transistor (IGBT) configuring an inverter reaches a limiting temperature, a command torque is limited to prevent overheating.

According to JP-A-H7-194094, the torque is limited regardless of the vehicle status. For example, if torque is limited while a vehicle is on a steep hill road, in a railroad crossing, or making a high-speed turn, there is a concern that the vehicle behavior may be different from what the driver desires.

SUMMARY

An embodiment provides a control apparatus that appropriately controls the torque of a rotary electric machine in accordance with the vehicle status.

As an aspect of the embodiment, a control apparatus is provided in a rotary electric machine driving system that includes a rotary electric machine serving as a drive source for a vehicle and a control unit that controls driving of the rotary electric machine. The apparatus includes: a malfunction determination section determining whether or not a system malfunction that requires torque limitation has occurred; a to-be-avoided state determination section determining whether or not the vehicle is in a to-be-avoided state; a torque limitation section limiting an output torque outputted from the rotary electric machine to a limiting torque smaller than a command torque, when the system malfunction is determined to have occurred and the vehicle is not in the to-be-avoided state; and a torque limitation relaxation section permitting the output torque to be a limitation relaxation torque larger than the limiting torque, when the system malfunction is determined to have occurred and the vehicle is in the to-be-avoided state.

BRIEF DESCRIPTION OF THE DRAWINGS

In the accompanying drawings:

FIGS. 7A to 7F are time charts illustrating the torque limitation relaxation process according to the second embodiment; and FIGS. 8A to 8F are time charts illustrating a torque limitation relaxation process according to a third embodiment.

DETAILED DESCRIPTION OF THE PREFERRED EMBODIMENTS

Figure 1:
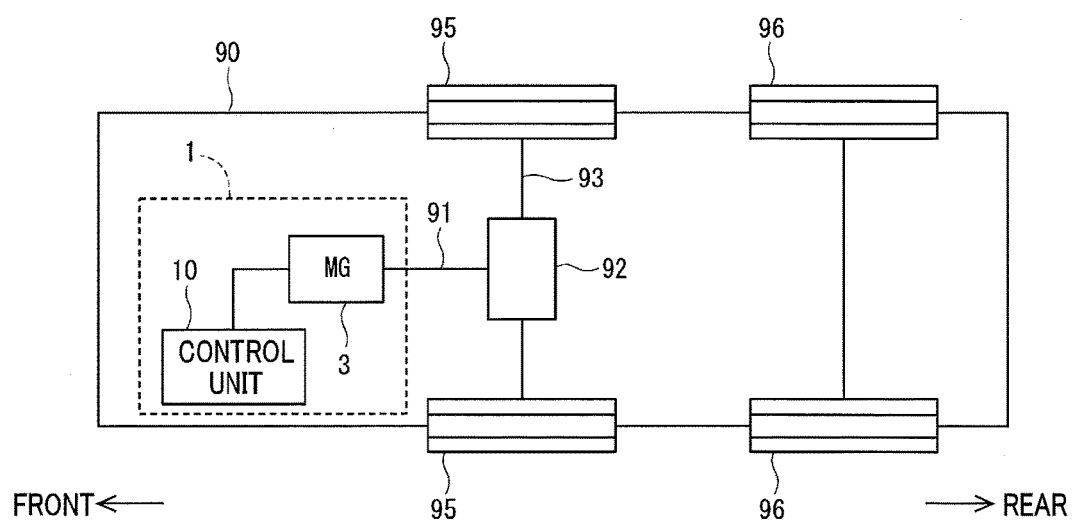
FIG. 1 is a diagram illustrating a vehicle to which an MG driving system according to a first embodiment is applied.

With reference to the accompanying drawings, hereinafter are described some embodiments of a control apparatus according to the present invention. In the embodiments below, the components identical with or similar to those are given the same reference numerals for the sake of omitting unnecessary description.

(First Embodiment)

Referring to FIGS. 1 to 5, a control apparatus according to the first embodiment is described.

Figure 2:
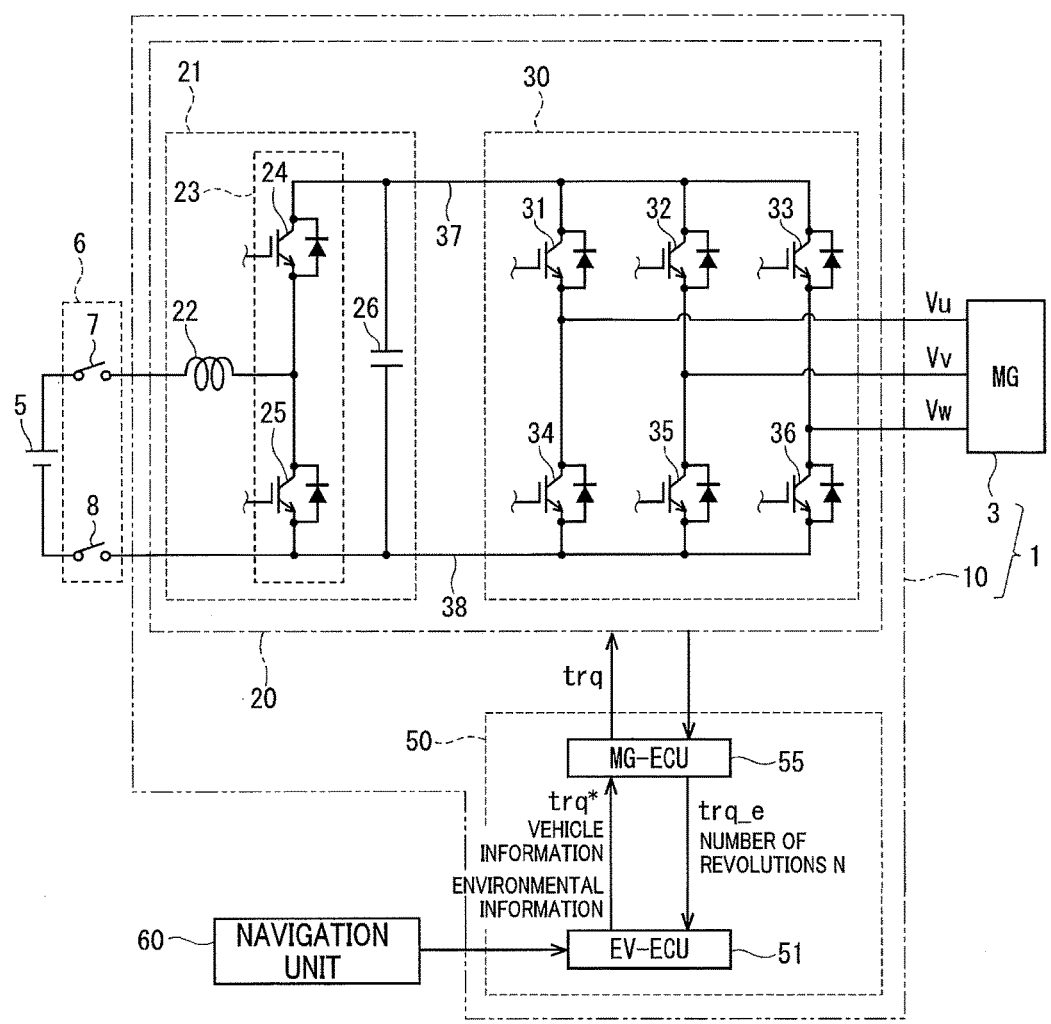
FIG. 2 is a block diagram illustrating the MG driving system according to the first embodiment.

FIG. 1 is a diagram illustrating a vehicle 90 to which a motor generator driving system 1 according to the first embodiment is applied. FIG. 2 is a block diagram illustrating the motor generator driving system 1. As illustrated in FIGS. 1 and 2, the motor generator driving system 1 serving as a rotary electric machine driving system is applied to the vehicle 90. The vehicle 90 of the present embodiment is an electric vehicle (EV) that is driven by a driving force of a motor generator 3 serving as a rotary electric machine. In the description below, the motor generator is referred to as MG as appropriate. The vehicle 90 is a so-called FF 2WD (front-wheel drive) vehicle in which the MG driving system 1 is mounted in front to drive front wheels 95. The vehicle 90 may be an FR 2WD (rear-wheel drive) vehicle in which rear wheels 96 are driven, or may be a 4WD (four-wheel drive) vehicle in which the front wheels 95 and the rear wheels 96 are driven.

The MG driving system 1 is provided with the motor generator 3 and a control unit 10. The motor generator 3 has a function as an electric motor that produces torque by being driven by power from a battery 5 (see FIG. 2) and a function as a power generator that generates power by being driven when braking is applied to the vehicle 90. The motor generator 3 of the present embodiment is a permanent magnet synchronous three-phase AC rotary machine. Description below is given focusing on a case where the motor generator 3 functions as an electric motor.

The driving force of the motor generator 3 is transmitted to a drive shaft 91. The driving force transmitted to the drive shaft 91 rotates the front wheels 95, which are driving wheels, via a differential gear 92 and an axle 93.

As shown in FIG. 2, the battery 5 is a direct current power source configured by a rechargeable secondary battery, such as a nickel hydride battery or a lithium ion battery. Instead of the battery 5, a power storage device, such as an electric double layer capacitor, may be used as the direct current power source. The battery 5 is controlled so that a state of charge (SOC) remains within a predetermined range.

The control unit 10 controls driving of the motor generator 3 and has a circuit section 20 and a control section 50.

The circuit section 20 is connected to the battery 5 via a relay 6. The relay 6 is configured by a high-potential-side relay 7 and a low-potential-side relay 8. The high- and low-potential-side relays 7 and 8 may be mechanical relays or may be semiconductor relays.

When the relay 6 is turned on, current is allowed to be passed between the battery 5 and the circuit section 20. When the relay 6 is turned off, current passed between the battery 5 and the circuit section 20 is interrupted.

The circuit section 20 has a boost converter 21 and an inverter section 30.

The boost converter 21 includes a reactor 22, a boost drive section 23, and a capacitor 26. The reactor 22 produces an induced voltage with the change of a reactor current IL, and accumulates electrical energy.

The boost drive section 23 has a high-potential-side switching element (hereinafter, a switching element is referred to as SW element) 24 and a low-potential-side SW element 25. Both the high- and low-potential-side SW elements 25 and 24 are insulated gate bipolar transistors (IGBTs). The high-potential-side SW element 24 has a collector connected to a high-potential line 37 of the inverter section 30, and an emitter connected to the collector of the low-potential-side SW element 25. The emitter of the low-potential-side SW element 25 is connected to a low-potential line 38 of the inverter section 30. A connection point between the high- and low-potential-side SW elements 24 and 25 is connected to an output terminal of the reactor 22.

The SW elements 24 and 25 are alternately and complementarily turned on/off according to a converter drive signal received from the control section 50. When the high-potential-side SW element 24 is turned off and the low-potential-side SW element 25 is turned on, the reactor current IL flows to the reactor 22 and thus energy is accumulated in the reactor 22. When the high-potential-side SW element 24 is turned on and the low-potential-side SW element 25 is turned off, energy accumulated in the reactor 22 is discharged and thus the capacitor 26 is charged with an output voltage that has been boosted by superimposing the induced voltage on a battery input voltage Vin.

The capacitor 26 is connected in parallel with the inverter section 30.

The inverter section 30 is a three-phase inverter having six SW elements 31 to 36 and is configured to enable two-sided heat radiation by a power card, not shown. The SW elements 31 to 36 of the present embodiment are all IGBTs. The SW elements 31 to 33 are disposed on a high-potential side, and the SW elements 34 to 36 are disposed on a low-potential side.

The high-potential-side SW elements 31 to 33 have collectors connected to the high-potential line 37. The emitter of the high-potential-side SW element 31 is connected to the collector of the low-potential-side SW element 34, the emitter of the high-potential-side SW element 32 is connected to the collector of the low-potential-side SW element 35, and the emitter of the high-potential-side SW element 33 is connected to the collector of the low-potential-side SW element 36. The low-potential-side SW elements 34 to 36 have emitters connected to the low-potential line 38.

Connection points between the SW elements 31 and 34, between the SW elements 32 and 35, and between the SW elements 33 and 36 are connected to respective ends of phase windings (U phase, V phase, and W phase) of the motor generator 3.

Pairs of the high- and low-potential-side SW elements, i.e. SW elements 31 and 34, SW elements 32 and 35, and SW elements 33 and 36, are alternately and complementarily turned on/off according to an inverter drive signal received from the control section 50.

The inverter section 30 receives an input of direct current power of the output voltage boosted by the boost converter 21. The DC power is converted to three-phase AC power by turning on/off the SW elements 31 to 36, and the converted power is outputted to the motor generator 3.

The control section 50 has a vehicle control section (EV-ECU in FIG. 2) 51 and an MG control section (MG-ECU in FIG. 2) 55 serving as a control apparatus.

The vehicle control section 51 and MG control section 55 are each configured mainly by a microcomputer including, for example, a CPU, a ROM, and a RAM. Various controls are performed by executing various control programs stored in the ROM. Each process of the control section 50 may be a software process achieved by the CPU' executing a program stored in advance, or may be a hardware process achieved by a dedicated electronic circuit.

The vehicle control section 51 receives signals from an accelerator sensor, a shift switch, a brake switch, a vehicle speed sensor, or the like, not shown, and controls the entire vehicle 90 according to these acquired signals.

The MG control section 55 acquires a command torque trq* suitable for a drive request of the vehicle 90, vehicle information including a traveling speed (hereinafter, referred to as vehicle speed) V and a lateral acceleration G of the vehicle 90, and environmental information described later, from the vehicle control section 51 to control the driving of the motor generator 3. Also, the MG control section 55 transmits an actual torque trq_e and the number of revolutions N of the motor generator 3 to the vehicle control section 51. Although information transmission between the vehicle control section 51 and the MG control section 55 is performed by a controller area network (CAN) in the present embodiment, other communication methods may be used.

Further, the MG control section 55 acquires temperature information related to the temperatures of the SW elements 31 to 36 (element temperature(s) T) from temperature sensors, not shown. The element temperature(s) T may be the temperatures of some or all of the SW elements 31 to 36, or may be an average of the temperatures of the SW elements. In the present embodiment, the element temperature T is the temperature of the circuit section.

A navigation unit 60 is configured mainly by a microcomputer including a CPU, a ROM and a RAM. The navigation unit 60 displays a map position of the vehicle 90 on a display, while searching for a route to a destination, on the basis of the current location of the vehicle 90 detected by a current location detection section, not shown, and map data.

In the present embodiment, the environmental information of the current location of the vehicle 90, which is based on the current location of the vehicle 90 and the map data, is transmitted to the vehicle control section 51.

In the present embodiment, when there is a malfunction in the MG driving system 1, the torque outputted from the motor generator 3 is limited.

In the present embodiment, such a malfunction in the MG driving system 1 (hereinafter simply referred to as system malfunction) corresponds to temperature rise in the SW elements 31 to 36. When the SW elements 31 to 36 are degraded, the thermal resistance increases and thus the rate of temperature rise in the SW elements 31 to 36 increases. Thus, when the temperature of the SW elements 31 to 36 becomes not less than a limitation start temperature Ts, which is a threshold temperature, it is determined that a system malfunction has occurred, and an output torque trq outputted from the motor generator 3 is limited. Thus, further temperature rise in the SW elements 31 to 36 is suppressed to prevent the SW elements 31 to 36 from thermal destruction.

In addition to the temperature rise in the SW elements 31 to 36, system malfunctions include temperature rise in electronic components configuring the boost converter 21, a CAN communication malfunction, and malfunctions of various sensors, such as a rotation angle sensor. When the front wheels 95 are caught in a gap or the like and are brought to a wheel-locked state where rotation is disabled, the motor generator 3 is brought to a motor-locked state where rotation is disabled if the command torque trq* is not zero. The wheel-locked state or the motor-locked state is hereinafter referred to as a locked state which is also included in the system malfunctions.

The vehicle 90 of the present embodiment is an electric vehicle (EV). Therefore, for example, when the output torque trq is limited at the time of starting the vehicle on an uphill road, there is a risk that the vehicle 90 moves down backward. Further, for example, when the front wheels 95 are caught in a gap in a railroad crossing and are brought to the locked state with the application of limitation to the output torque trq, there is a risk that the vehicle is not able to escape from the railroad crossing. Furthermore, for example, when the output torque trq is suddenly limited during a high-speed turn or the like, there is a risk that the vehicle 90 spins.

In the present embodiment, start on an uphill road (hereinafter, referred to as hill start), continued locked state, high-speed turn, or the like is taken as a state which should be avoided and is referred to as to-be-avoided state. In the to be-avoided state, torque limitation is temporarily relaxed to terminate such a to-be-avoided state. A state that is not the to-be-avoided state is taken as a normal state.

Figure 3:
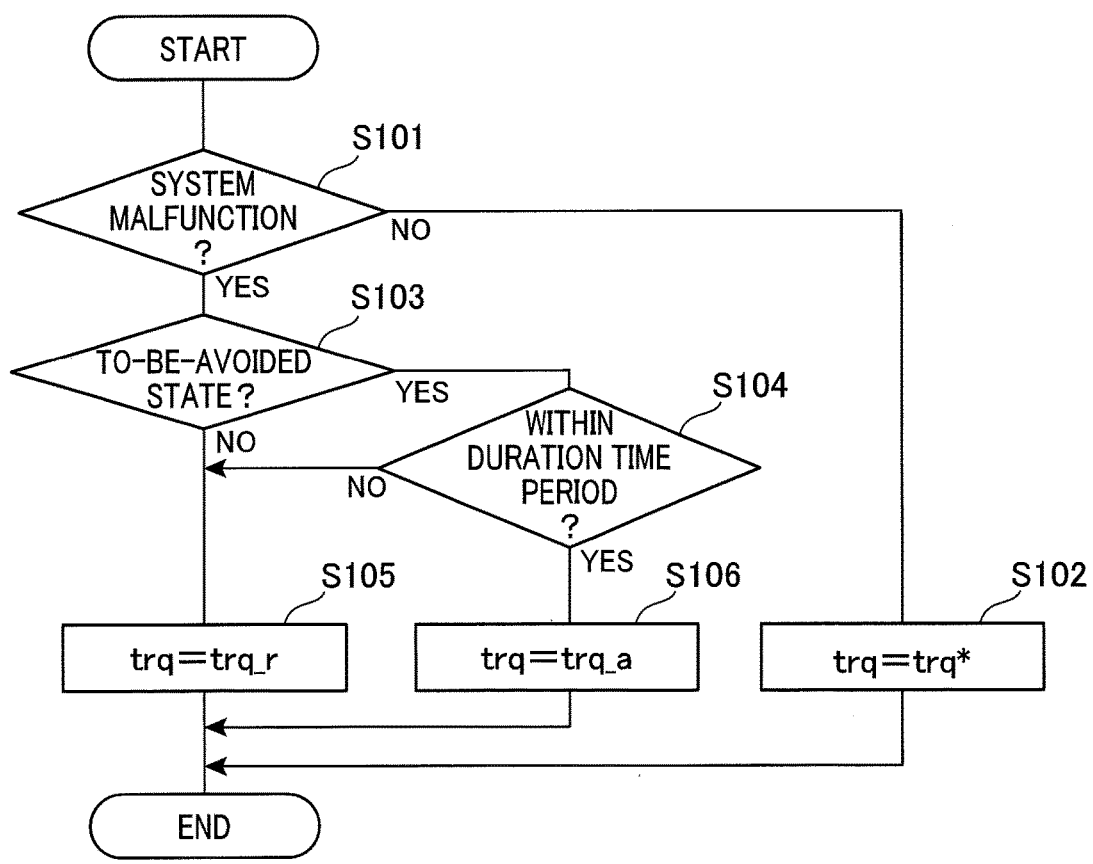
FIG. 3 is a flow diagram illustrating a torque limitation relaxation process according to the first embodiment.

Referring to the flowchart illustrated in FIG. 3, a torque limitation relaxation process of the present embodiment is described. The process is executed by the MG control section 55 at predetermined intervals when the vehicle 90 is ready on.

In first step S101, the MG control section 55 determines whether or not there is an occurrence of a system malfunction. When it is determined that a system malfunction has occurred (YES in step S101), a system malfunction flag FlgE is set and the process proceeds to step S103. When the system malfunction flag FlgE is already set, the set state is kept. When it is determined that there is no occurrence of a system malfunction (NO in step S101), the process proceeds to step S102. When the system malfunction flag FlgE is already set, it is reset.

In step S102, the output torque trq of the motor generator 3 is not limited. Specifically, the output torque trq is controlled so as to be the command torque trq*.

In step S103 performed when a system malfunction is determined to have occurred (YES int step S101), the MG control section 55 determines whether or not the vehicle 90 is in the to-be-avoided state. The to-be-avoided state includes, for example, hill start, locked state, or high-speed turn. Whether the vehicle is in the to-be-avoided state is determined on the basis of the vehicle status based on detected values derived from a vehicle speed sensor, a yaw rate sensor and the like, and environmental information of the vehicle 90 acquired from the navigation unit 60. When the vehicle 90 is determined not to be in the to-be-avoided state (NO in step S103) and a to-be-avoided state determination flag FlgA is already set, the flag is reset and the process proceeds to step S105. When the vehicle 90 is determined to be in the to-be-avoided state (YES in step S103) the MG control section 55 sets the to-be-avoided state determination flag FlgA and the process proceeds to step S104. When the to-be-avoided state determination flag FlgA is already set, the set state is kept.

In step S104, a determination is made as to whether the time period of relaxing the torque limitation is within a predetermined time period (hereinafter the time period is referred to as duration time period). In the duration time period, the control unit 10 can be protected. The duration time period is set to an extent of not damaging the control unit 10, particularly the SW elements 31 to 36 configuring the inverter section 30. When it is determined that the time period of relaxing the torque limitation exceeds the duration time period (NO in step S104), the process proceeds to step S105. When it is determined that the time period of relaxing the torque limitation is within the duration time period (YES in step S104), the process proceeds to S106.

In step S105, the output torque trq of the motor generator 3 is limited to a limiting torque trq_r. The limiting torque trq_r is a value less than the command torque trq*. That is, trq_r<trq*.

The limiting torque trq_r may be a predetermined value (e.g. zero) or may be a value obtained by multiplying the command torque trq* by a predetermined torque limitation factor Kt which is less than 1. The relay 6 may be turned off to turn the output torque trq to zero.

Figure 4:
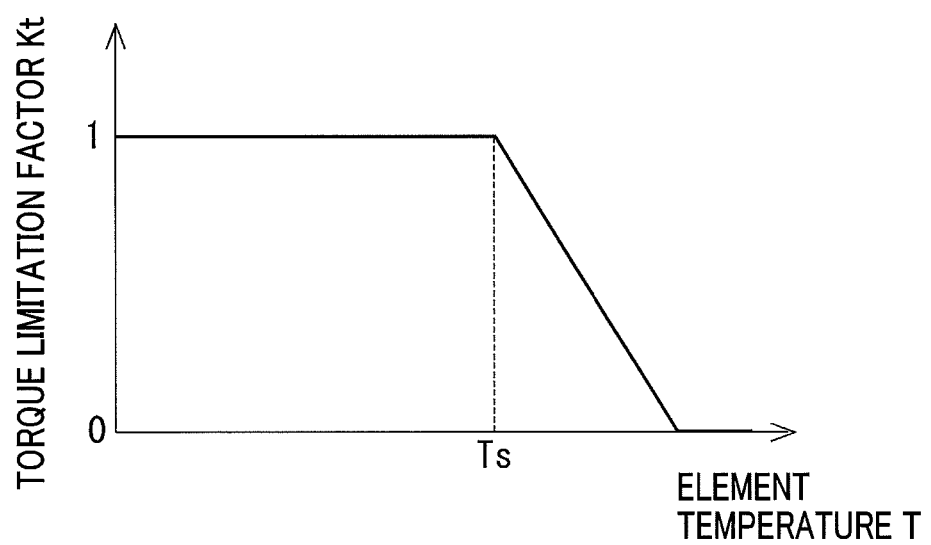
FIG. 4 is a diagram illustrating a relationship between an element temperature and a torque limitation factor according to the first embodiment.
Figure 5:
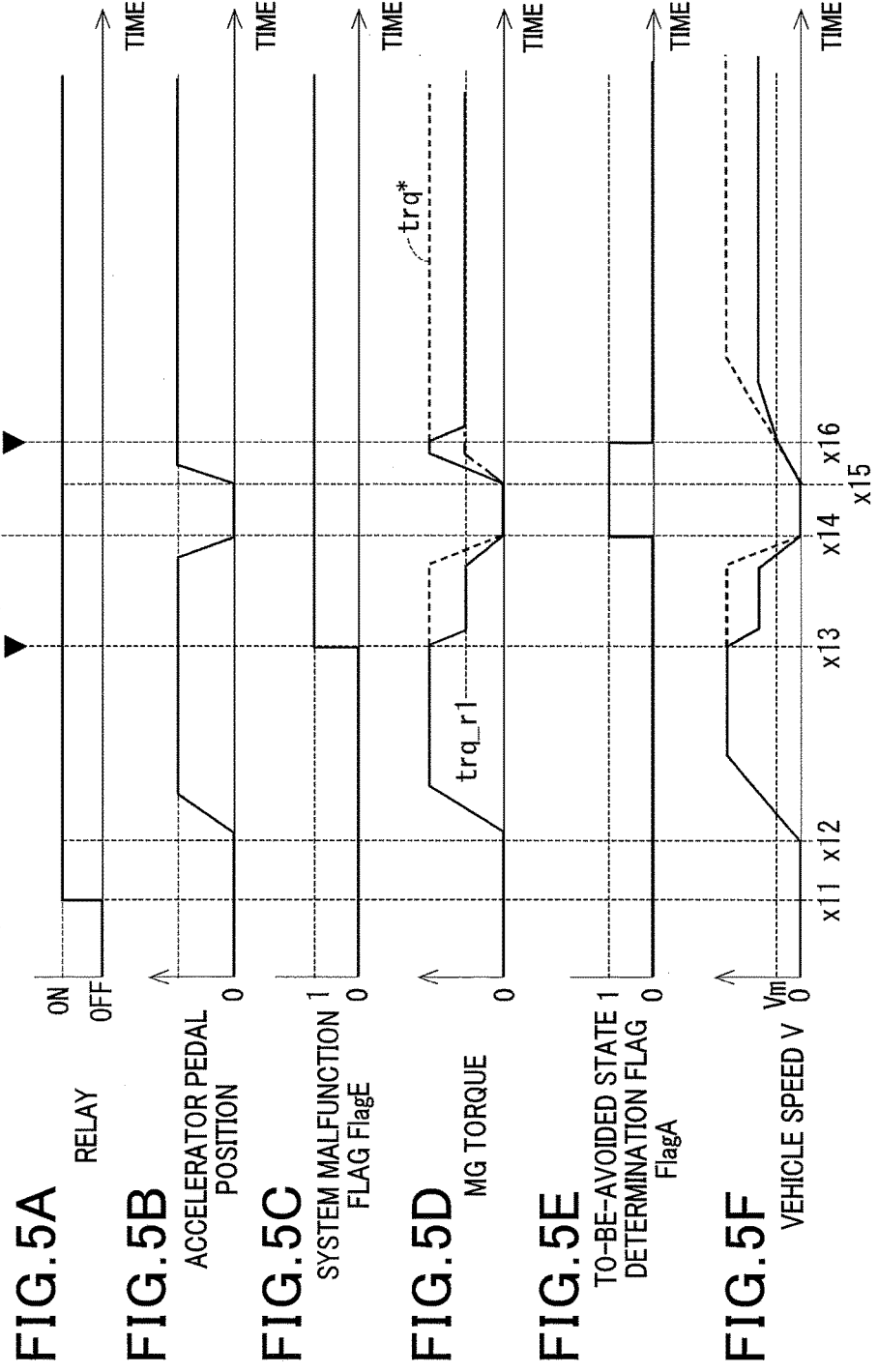
FIGS. 5A to 5F are time charts illustrating the torque limitation relaxation process according to the first embodiment.

When the system malfunction is rise of the element temperature T, the limiting torque trq_r may be a value obtained by multiplying the command torque trq* by a torque limitation factor Kt which is set according to the element temperature T on the basis of a limitation factor map shown in FIG. 4.

Specifically, as shown in FIG. 4, the MG control section 55 stores a map in which the element temperature T is correlated with the torque limitation factor Kt so that the torque limitation factor Kt is less than 1 when the element temperature T becomes higher than the limitation start temperature Ts. Although FIG. 4 shows one map, a plurality of maps may be stored in which at least one of the limitation start temperature Ts and the slope of the torque limitation factor Kt is different between the maps according to the degradation condition of the SW elements 31 to 36.

Referring to FIG. 3 again, the process proceeds to step S106 on condition that that system malfunction has occurred, and the vehicle 90 is in the to-be-avoided state (YES in step S101, and YES in step S103), and the time period of relaxing the torque limitation is within the duration time period (YES in step S104). In step S106, the torque limitation of the motor generator 3 is relaxed. Specifically, the output torque trq is controlled so as to be a limitation relaxation torque trq_a which is larger than the limiting torque trq_r. The limitation relaxation torque trq_a may be the command torque trq*. A magnitude relationship between the values is expressed by trq_r<trq_a≤trq*.

By repeating the present process, the torque limitation is relaxed temporarily in a time period from when the to-be-avoided state is cancelled until when the normal state is restored. If the system malfunction continues after termination of the to-be-avoided state, torque is limited, thereby limiting the output torque trq to the limiting torque trq_r. If the system malfunction is eliminated after termination of the to-be-avoided state, the limitation of the output torque trq is cancelled, and the output torque trq is controlled so as to be the command torque trq*.

Referring to the time charts illustrated in FIGS. 5A to 5F, the torque limitation relaxation process of the present embodiment is described. FIG. 5A shows an on/off state of the relay 6. FIG. 5B shows the accelerator pedal position. FIG. 5C shows the system malfunction flag FlgE. FIG. 5D shows the MG torque. FIG. 5E shows the to-be-avoided state determination flag FlgA. FIG. 5F shows the vehicle speed V. In FIGS. 5A to 5F, a state where a flag is set is indicated by 1 and a state where the flag is not set is indicated by 0. The solid lines indicate the present embodiment where a torque limitation process and the torque limitation relaxation process are performed, dashed lines indicate a case where the torque limitation process is not performed, and dash-dot lines indicate a case where the torque limitation process is performed and the torque limitation relaxation process is not performed. For clarity, a delay process is omitted and rescaling is applied as appropriate. The same applies to FIGS. 7A to 7F and FIGS. 8A to 8F referred to later.

FIGS. 5A to 5F show an example in which the system malfunction is rise of the element temperature T and the to-be-avoided state is hill start.

When the vehicle 90 is ready on at time x11, the relay 6 is turned on, and at time x12, the accelerator pedal is pressed to start the vehicle 90. At time x13, when the element temperature T becomes higher than the limitation start temperature Ts, it is determined that there is a system malfunction and the system malfunction flag FlgE is set. When the system malfunction flag FlgE is set, the output torque trq is controlled so as to be the limiting torque trq_r which is obtained by multiplying the command torque trq* by the torque limitation factor Kt that is in accordance with the element temperature T. For simplification, in FIGS. 5A to 5F, the torque limitation factor Kt is constant. As indicated by the dashed lines, without torque limitation, there is a probability that the SW elements 31 to 36 are thermally damaged by temperature rise in the SW elements 31 to 36.

At time x14, the vehicle 90 stops. In this situation, an inclination angle in the longitudinal direction of the vehicle 90 is taken as θs, which is positive when the front is tilted upward, and negative when tilted downward. When the inclination angle θs is larger than a threshold angle θth, the road is taken to be an uphill road. Whether the road is an uphill road may be determined on the basis of the environmental information acquired from the navigation device 60.

At time x14, the vehicle 90 is on an uphill road and the vehicle speed V is zero, meaning that the vehicle is in a situation of hill start. Thus, the vehicle 90 is taken to be in the to-be-avoided state, and the to-be-avoided state determination flag FlgA is set.

At time x15, the brake pedal is released (not shown) and the accelerator pedal is pressed. In this situation, if the output torque trq is limited, the vehicle has a risk of moving down backward. In the present embodiment, the output torque trq is controlled so as to be the limitation relaxation torque trq_a which is larger than the limiting torque trq_r. In this case, the torque limitation factor Kt is 1 and the limitation relaxation torque trq_a is equal to the command torque trq*. The temporary relaxation of the torque limitation in hill start enables output of torque which is larger than the torque in the case of performing the torque limitation process as indicated by the dash-dot line. Thus, the vehicle 90 is prevented from moving down backward.

At time x16, when the vehicle speed V becomes higher than a start completion speed Vm, the to-be-avoided state determination flag FlgA is reset. In this case, when the system malfunction flag FlgE is already set, the output torque trq is controlled so as to be the limiting torque trq_r. Although not shown, when the system malfunction flag FlgE is reset due to decrease of the element temperature T, the output torque trq is controlled so as to be the command torque trq* without performing torque limitation. The magnitude relationship between the vehicle speed V and the start completion speed Vm when the vehicle 90 travels at the limiting torque trq_r can be reversed depending on the torque limitation factor Kt.

As described above in detail, the MG driving system 1 has the motor generator 3 serving as a drive source for the vehicle 90, and the control unit 10 for controlling driving of the motor generator 3.

The MG control section 55 performs the following process.

The MG control section 55 determines whether or not a system malfunction that requires torque limitation has occurred in the MG driving system 1 (step S101 in FIG. 3). The MG control section 55 determines whether or not the vehicle 90 is in the to-be-avoided state (step S103).

When a system malfunction is determined to have occurred and the vehicle 90 is not in the to-be-avoided state (YES in step S101, and NO in step S103), the MG control section 55 permits the output torque trq outputted from the motor generator 3 to be the limiting torque trq_r which is smaller than the command torque trq* (step S105).

When a system malfunction is determined to have occurred and the vehicle 90 is in the to-be-avoided state (YES in step S101, and YES in step S103), the MG control section 55 permits the output torque trq to be the limitation relaxation torque trq_a which is larger than the limiting torque trq_r (step S106).

Thus, the output torque trq of the motor generator 3 can be appropriately controlled according to the status of the vehicle 90.

Specifically, when a system malfunction that requires torque limitation has occurred, such as temperature rise in the SW elements 31 to 36 or a CAN communication malfunction, the MG driving system 1 can be protected by performing the torque limitation.

When the vehicle 90 is in the to-be-avoided state, such as hill start, motor lock, and high-speed turn, performing temporary relaxation of the torque limitation can appropriately restore the vehicle to the normal state from the to-be-avoided state. By relaxing the torque limitation in the to-be-avoided state, the driver's intention can be reflected to the vehicle control as much as possible. Thus, drivability in the to-be-avoided state can be improved and the vehicle 90 can be safely evacuated.

The time period in which the output torque trq is permitted to serve as the limitation relaxation torque trq_a is within the duration time period. The duration time period is a time period in which the control unit 10 can be protected.

There may be a situation where, for example, the switching elements are thermally destructed when torque limitation relaxation is continued before the to-be-avoided state is cancelled. As in this situation, when the predetermined duration time period has elapsed after start of torque limitation relaxation, the torque limitation relaxation is cancelled and the output torque is controlled so as to be the limiting torque even if the to-be-avoided state has not been cancelled. With this configuration, the control unit 10, particularly the SW elements 31 to 36, is/are prevented from being thermally damaged due to the relaxation of torque limitation.

When the element temperature T, which is the temperature of the circuit section 20, is higher than the limitation start temperature Ts, the MG control section 55 determines that a system malfunction has occurred. With this configuration, thermal degradation of the circuit section 20 can be suppressed.

When the vehicle 90 is on an uphill road and the traveling speed is zero, the MG control section 55 determines that the vehicle 90 is in the to-be-avoided state. With this configuration, the vehicle 90 can be prevented from moving down backward due to the torque limitation at the time of hill start.

The MG control section 55 determines whether or not the vehicle is in the to-be-avoided state, on the basis of the environmental information acquired from the navigation unit 60. With this configuration, the to-be-avoided state of the vehicle 90 can be appropriately determined.

In the present embodiment, the MG control section 55 configures a malfunction determination means (section), a to-be-avoided state determination means (section), a torque limitation means (section), and a torque limitation relaxation means (section). Step S101 of FIG. 3 corresponds to the process functioning as the malfunction determination means (section), step S103 corresponds to the process functioning as the to-be-avoided state determination means (section), step S105 corresponds to the process functioning as the torque limitation means (section), and step S106 corresponds to the process functioning as the torque limitation relaxation means (section).

(Second Embodiment)

Referring to FIG. 6 and FIGS. 7A to 7F, the second embodiment is described. The configuration and the like of the MG driving system 1 are the same as those of the above embodiment.

In the present embodiment, the system malfunction is a locked state and the to-be-avoided state is a continued locked state.

Figure 6:
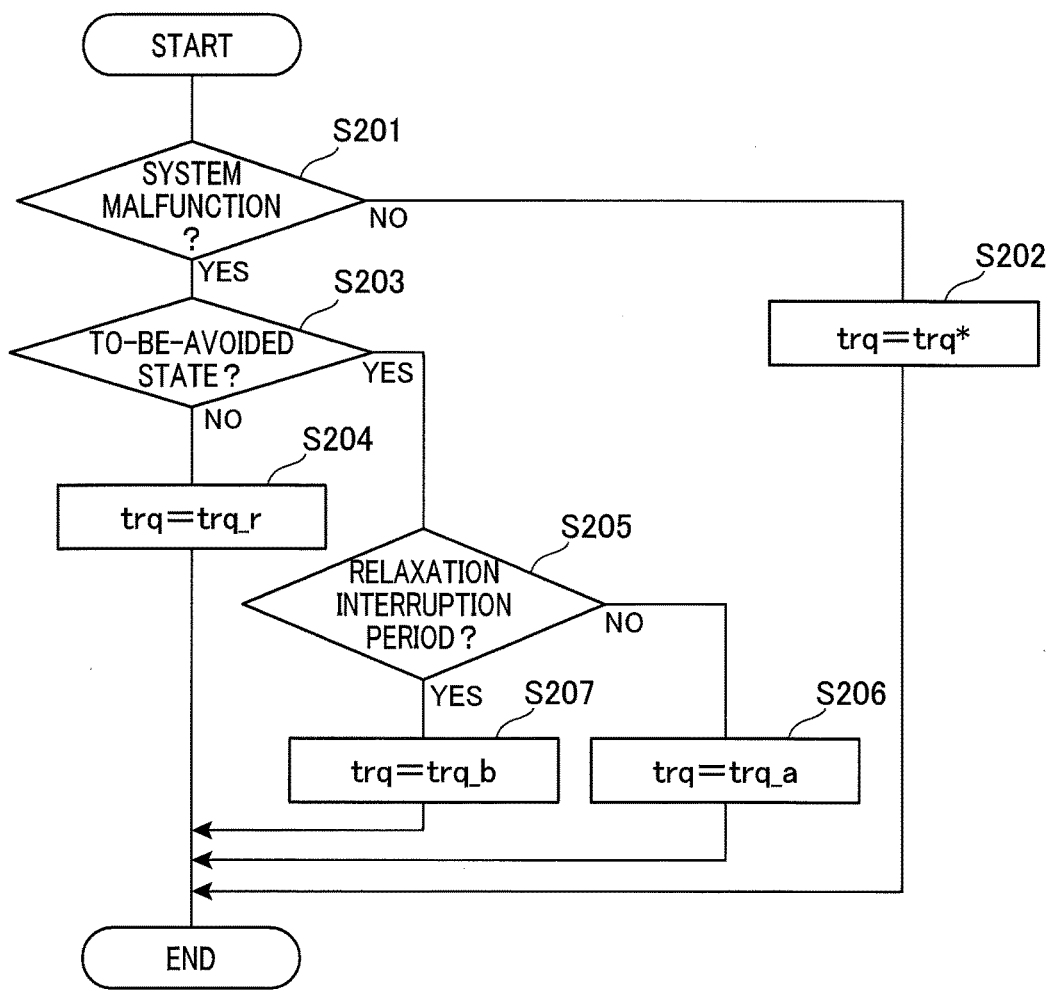
FIG. 6 is a flowchart illustrating a torque limitation relaxation process according to a second embodiment.

Referring to the flowchart illustrated in FIG. 6, a torque limitation relaxation process of the present embodiment is described. Steps S201 to S203 are substantially the same as steps S101 to S103 of FIG. 3, and step S204 is substantially the same as step S105.

In step S201, when the command torque trq* is not zero and the number of revolutions N of the motor generator 3 is zero, this state is taken as a locked state, and thus it is determined that there is a system malfunction. Taking account of sensor errors or the like, when the number of revolutions N is approximately zero which is not more than a predetermined threshold value, the number of revolutions N is taken to be zero.

In step S201, when the accelerator pedal position corresponds to a predetermined opening or more and the vehicle speed V is less than a lock determination speed Vr, this state is taken as a locked state, and it may be determined that there is a system malfunction.

On condition that a system malfunction is determined to have occurred and the vehicle 90 is in the to-be-avoided state (YES in step S201, and YES in S203), the process proceeds to step S205. In step S205, the MG control section 55 determines whether or not the vehicle is in a relaxation interruption time period Pb. In the present embodiment, when a system malfunction occurs and the vehicle 90 is in the to-be-avoided state, it is determined whether the vehicle is in the relaxation interruption time period Pb using a timer, a counter or the like, thereby intermittently relaxing the torque limitation. The relaxation of torque limitation is conducted by alternately repeating a limitation relaxation time period Pa and the relaxation interruption time period Pb. For example, the limitation relaxation time period Pa and the relaxation interruption time period Pb are each several seconds. When it is determined that the vehicle is in the relaxation interruption time period Pb (YES in step S205), the process proceeds to step S207. When it is determined that the vehicle is not in the relaxation interruption period Pb (NO in step S205), i.e., the limitation relaxation period Pa, the process proceeds to step S206.

In step S206, similar to step S105, the torque limitation is relieved. Specifically, the output torque trq is controlled so as to be the limitation relaxation torque trq_a which is larger than the limiting torque trq_r.

In step S207, the relaxation of torque limitation is interrupted to limit the output torque trq. Specifically, the output torque trq is controlled so as to be an interruption torque trq_b which is smaller than the limitation relaxation torque trq_a.

The magnitude relationship herein is expressed by $trq\_r \leq trq\_b < trq\_a \leq trq^*$. In the present embodiment, the interruption torque trq_b is equal to the limiting torque trq_r and the limitation relaxation torque trq_a is equal to the command torque trq*.

Referring to the time chart illustrated in FIGS. 7A to 7F, the torque limitation relaxation process of the present embodiment is described.

At time x21, the vehicle 90 is ready on and the relay 6 is turned on. At time x22, the accelerator pedal is pressed to start the vehicle 90. At time x23, the vehicle stops before a railroad crossing. At time x24, the vehicle enters the railroad crossing and is caught in a gap and, at time x25, brought into a locked state.

Since current is continuously passed to a specific phase during the locked state, a turn-on state may be continued in some of the SW elements 31 to 36 and the turned on SW elements 31 to 36 may be overheated. Therefore, when the vehicle is in the locked state, a system malfunction is taken as having occurred, and the output torque trq is limited.

In this case, if the torque limitation is continued, there is a probability that the locked state is not cancelled and the state where the vehicle speed V is zero continues. The state where the locked state continues and the vehicle 90 remains in the railroad crossing is dangerous.

In the present embodiment, the locked state continuing for a lock duration time period Pr or more is taken to be the to-be-avoided state, and the to-be-avoided state determination flag FlgA is set. When it is clear that the current location of the vehicle 90 is on a railroad crossing on the basis of the information acquired from the navigation unit 60, the lock duration time period Pr may be zero.

In the present embodiment, as indicated by the solid line, the torque limitation is temporarily cancelled at time x26 or later, after lapse of the lock duration time period Pr. In the present embodiment, the torque limitation is intermittently cancelled by repeating the limitation relaxation time period Pa and the relaxation interruption time period Pb. In this example, the output torque trq is controlled so as to be the limitation relaxation torque trq_a (trq* in the present embodiment) in the limitation relaxation time period Pa, and the output torque trq is controlled so as to be the interruption torque trq_b (trq_r in the present embodiment) in the relaxation interruption time period Pb. The to-be-avoided state determination flag FlgA may be reset in the limitation relaxation time period Pa, and may be set in the relaxation interruption time period Pb.

The limitation relaxation time period Pa and the relaxation interruption time period Pb are alternately repeated to intermittently relax the torque limitation and swing the vehicle 90 like a pendulum, thereby facilitating escape from the gap. When the vehicle 90 escapes from the gap, and the vehicle speed V becomes higher than the lock determination speed Vr, at time x27, the locked state is taken to have been cancelled and thus the system malfunction flag FlgE and the to-be-avoided state determination flag FlgA are reset, and the torque limitation is also cancelled. That is, at time x27 or later, the output torque trq is controlled so as to be the command torque trq*.

In the present embodiment, the limitation relaxation time period Pa may be taken to be the predetermined duration time period, or the time period after the to-be-avoided state determination flag FlgA is set may be taken to be the predetermined duration time period.

The MG control section 55 alternately performs the limitation relaxation time period Pa in which the limitation relaxation torque trq_a is the output torque trq, and the relaxation interruption time period Pb in which the output torque trq is made smaller than the limitation relaxation torque trq_a.

Thus, when the to-be-avoided state is a motor-locked state, the to-be-avoided state can be appropriately restored to the normal state. Further, temperature rise due to the continuation of the limitation relaxation time period Pa is suppressed in the SW elements 31 to 36.

In a locked state where rotation of the motor generator 3 is locked, the MG control section 55 determines that a system malfunction has occurred. When the locked state continues for a lock duration time period Pr or more, the MG control section 55 determines that the vehicle 90 is in the to-be-avoided state. Thus, when the locked state continues and thus the torque limitation is relaxed, the locked state is appropriately restored to the normal state.

In addition, this embodiment can provide the advantageous effects similar to those of the above embodiment.

In the present embodiment, step S201 of FIG. 6 corresponds to a process functioning as a malfunction determination means (section), step S203 corresponds to a process functioning as a to-be-avoided state determination means (section), step S204 corresponds to a process functioning as a torque limitation means (section), and steps S206 and S207 correspond to a process functioning as a torque limitation relaxation means (section).

(Third Embodiment)

Referring to FIGS. 8A to 8F, the third embodiment is described. The configuration of the MG driving system 1 is the same as that in the above embodiments.

In the present embodiment, the system malfunction is a CAN communication malfunction and the to-be-avoided state is high-speed turn. In the present embodiment, when the yaw rate has a predetermined value or more and thus the vehicle 90 is in a high-speed turn, this state is taken to be the to-be-avoided state.

The flow diagram of the torque limitation relaxation process is substantially the same as the one shown in FIG. 3. The points different from those of the first embodiment are described below. In the present embodiment, on condition that a CAN communication malfunction occurs and the vehicle 90 is not in the to-be-avoided state (YES in step S101, and NO in step S103), the process proceeds to step S150. In step S105, the relay 6 is turned off and power supply to the motor generator 3 side is interrupted to set the output torque trq to zero.

On condition that a CAN communication malfunction occurs and the vehicle 90 is in high-speed turn (YES in step S101, and YES in step S103) and duration of the state is within the duration time period (YES in step S104), the process proceeds to step S160. In step S106, the relay 6 is not turned off and a value obtained by multiplying the immediately previous output torque trq by a gradually changing factor Kd of less than 1 is used as the limitation relaxation torque trq_a of this cycle. The gradually changing factor Kd is set so that a variation in the lateral acceleration G of the vehicle 90 will be a predetermined value (e.g. 0.1 G) or less.

Referring to the time charts illustrated in FIGS. 8A to 8F, the torque limitation relaxation process of the present embodiment is described.

At time x31, the vehicle 90 is ready on and the relay 6 is turned on. When the vehicle starts making a high-speed turn, at time x32, the to-be-avoided state determination flag FlgA is set. At time x33 during high-speed turn, a CAN communication malfunction occurs and the system malfunction flag FlgE is set. As indicated by the dash-dot line, when the relay 6 is turned off to limit the output torque trq, the output torque trq abruptly varies and thus there is a probability that the vehicle 90 spins.

In the present embodiment, when the system malfunction flag FlgE is set, and the to-be-avoided state determination flag FlgA is also set, the relay 6 is not turned off and the limitation relaxation torque trq_a is controlled to be gradually smaller.

At time x34, when the high-speed turn is terminated and the to-be-avoided state determination flag FlgA is reset, the relay 6 is turned off and power supply to the motor generator 3 is interrupted.

In the present embodiment, the MG control section 55 gradually reduces the limitation relaxation torque trq_a. This can prevent abrupt variation of the output torque trq. Accordingly, for example, when the to-be-avoided state occurs during high-speed turn of the vehicle 90, the vehicle 90 can be prevented from spinning. This is effective, not only during high-speed turn, but also in the case where the to-be-avoided state is a rapid deceleration prohibition state, such as high-speed traveling, which is a travelling state where rapid deceleration is dangerous.

When a communication malfunction occurs in relation to the vehicle control section 51, which is a unit different from the MG control section 55, the MG control section 55 determines that a system malfunction has occurred. According to this configuration, torque limitation can be appropriately performed in the occurrence of a communication malfunction.

When the vehicle 90 is making a high-speed turn, the MG control section 55 determines that the vehicle 90 is in the to-be-avoided state. Accordingly, the output torque trq is limited in the high-speed turn of the vehicle 90, thereby preventing the vehicle 90 from spinning.

In addition, this embodiment can provide advantageous effects similar to those of the above embodiments.

(Other Embodiments)

(A) Malfunction Determination Means, To-Be-Avoided State Determination Means, and Torque Limitation Relaxation Means In the above embodiments, after a malfunction determination is made by the malfunction determination means (section), the to-be-avoided state determination is made by the to-be-avoided state determination means (section). In another embodiment, malfunction determination may be made by the malfunction determination means (section) after a to-be-avoided state determination is made by the to-be-avoided state determination means (section).

In the above embodiments, the time period of relaxing the torque limitation to permit the output torque to be the limitation relaxation torque is within the duration time period in which the control unit can be protected. In another embodiment, a protection process to protect the rotary electric machine driving system may be performed in a process separate from the torque limitation relaxation process. For example, the separate process may be performed by turning off the relay when the temperature of the circuit section reaches a temperature that is likely to cause thermal destruction. In this case, step S104 of FIG. 3 may be omitted to continue the relaxation of torque limitation until the to-be-avoided state is cancelled in the torque limitation relaxation process.

In the first embodiment, when the system malfunction is temperature rise of the circuit section and the to-be-avoided state is hill start, the output torque is controlled so as to be the limitation relaxation torque. In the second embodiment, when the system malfunction is a locked state and the to-be-avoided state is a continued locked state, the torque limitation relaxation is performed intermittently. In the third embodiment, when the system malfunction is a CAN communication malfunction and the to-be-avoided state is a high-speed turn, the limitation relaxation torque is gradually changed.

In another embodiment, the system malfunction may be any malfunction, such as overvoltage or overcurrent, in the motor generator driving system, not being limited to temperature rise of the circuit section, locked state, or communication malfunction. In another embodiment, the to-be-avoided state may be any state where there is a probability that the vehicle behavior differs from what the driver intends due to the application of output limitation. In addition, based on the environmental information acquired from the navigation unit, a state where the current location of the vehicle is in a railroad crossing or on a road having a low coefficient of friction may be taken to be the to-be-avoided state.

The torque limitation relaxation process is performed if the combination of the system malfunction condition with the to-be-avoided state is different from the combinations in the above embodiments. When a system malfunction has occurred and the vehicle is in the to-be-avoided state, the limitation relaxation torque may be controlled in any manner as long as the torque limitation is relieved to allow the torque to be more than the limiting torque (i.e., as long as the limitation relaxation torque is larger than the limiting torque).

In the first embodiment, the element temperature of the SW elements configuring the inverter section is the temperature of the circuit section. In another embodiment, the temperature of the circuit section may be the temperature of various electronic components configuring the boost converter or the temperature of cooling water for cooling the circuit section.

(B) Control Apparatus

In the above embodiments, each means is configured by the MG control section. In another embodiment, all or some of the means may be configured by the vehicle control section, or may be configured by another control section, such as a battery control section, not shown. Alternatively, the MG control section and the vehicle control section may be configured as a single control section.

The vehicle control section does not necessarily have to acquire information from the navigation unit. In this case, without using the environmental information acquired from the navigation unit, system malfunction determination and to-be-avoided state determination are made on the basis of the vehicle information. Alternatively, a system malfunction and the to-be-avoided state may be determined on the basis of image information derived from an in-vehicle camera. Thus, for example, the presence of a following vehicle may be determined using image information derived from an in-vehicle camera.

(C) Circuit Section

In the above embodiments, the SW elements are configured by IGBTs. In another embodiment, the SW elements may be configured by semiconductor elements or the like other than IGBTs. In the above embodiments, the inverter section is configured to enable two-sided heat radiation by a power card. In another embodiment, the heat radiation structure may be one-sided heat radiation. The inverter section may be configured by a component other than a power card.

In the above embodiments, the circuit section has the boost converter. In another embodiment, the boost converter may be omitted. Alternatively, the relay does not necessarily have to be provided between the power source and the circuit section.

(D) Rotary Electric Machine

In the above embodiments, the rotary electric machine is a permanent magnet synchronous three-phase AC rotary machine. In another embodiment, it may be a rotator other than a permanent magnet synchronous three-phase AC rotator.

(E) Vehicle

In the above embodiments, the vehicle is an electric vehicle (EV). In another embodiment, the vehicle may be any vehicle, such as a fuel cell vehicle or a hybrid vehicle, as long as a motor is used as a drive source for the vehicle. In the above embodiments, no transmission is provided between the motor generator and the differential gear. In another embodiment, a transmission may be provided between the motor generator and the differential gear. The transmission may be a continuously variable transmission or may be a multi-stage transmission.

The present invention should not be construed as being limited to the above embodiments, but various modifications may be made without departing from the spirit of the invention.

Hereinafter, aspects of the above-described embodiments will be summarized.

As an aspect of the embodiment, a control apparatus (55) is provided which includes a malfunction determination section (S101, S201), a to-be-avoided state determination section (S103, S203), a torque limitation section (S105, S204), and a torque limitation relaxation section (S106, S206, S207). The malfunction determination section determines whether or not a system malfunction that requires torque limitation has occurred in a rotary electric machine driving system. The rotary electric machine driving system (1) has a rotary electric machine (3) serving as a drive source for a vehicle (90) and a control unit (10) that controls driving of the rotary electric machine.

The to-be-avoided state determination section determines whether or not the vehicle is in a state where should be avoided (hereinafter referred to as to-be-avoided state).

The torque limitation section permits an output torque outputted from the rotary electric machine to serve as a limiting torque smaller than a command torque, when it is determined that the system malfunction has occurred and the vehicle is not in the to-be-avoided state.

The torque limitation relaxation section permits an output torque to serve as a limitation relaxation torque larger than a limiting torque, when it is determined that the system malfunction has occurred and the vehicle is in the to-be-avoided state.

Thus, the torque of the rotary electric machine can be appropriately controlled in accordance with the status of the vehicle. Specifically, for example, in the occurrence of a system malfunction, such as temperature rise in a switching element or a communication malfunction, which requires torque limitation, the rotary electric machine driving system can be protected by performing the torque limitation.

When the vehicle is in the to-be-avoided state, such as hill start, motor lock, or high-speed turn, the to-be-avoided state can be appropriately restored to a normal state by temporarily relieving torque limitation.

What is claimed is:

1. A control apparatus provided in a rotary electric machine driving system that includes a rotary electric machine serving as a drive source for a vehicle and a control unit that controls driving of the rotary electric machine, the control apparatus comprising:
   a malfunction determination section determining whether or not a system malfunction that requires torque limitation has occurred;
   a to-be-avoided state determination section determining whether or not the vehicle is in a to-be-avoided state;
   a torque limitation section limiting an output torque outputted from the rotary electric machine to a limiting torque smaller than a command torque, when the system malfunction is determined to have occurred and the vehicle is not in the to-be-avoided state; and
   a torque limitation relaxation section permitting the output torque to be a limitation relaxation torque larger than the limiting torque, when the system malfunction is determined to have occurred and the vehicle is in the to-be-avoided state;
   wherein the torque limitation relaxation section alternately applies a limitation relaxation period in which the output torque is permitted to be the limitation relaxation torque, and a relaxation interruption period in which the output torque is made smaller than the limitation relaxation torque.

2. The control apparatus according to claim 1, wherein a time period in which the output torque is permitted to be the limitation relaxation torque is within a duration time period.

3. The control apparatus according to claim 1, wherein the torque limitation relaxation section gradually reduces the limitation relaxation torque.

4. The control apparatus according to claim 1, wherein:
   the control unit has a circuit section including an inverter section that converts power of the rotary electric machine; and
   the malfunction determination section determines that the system malfunction has occurred when a temperature of the circuit section is higher than a threshold temperature.

5. The control apparatus according to claim 1, wherein the malfunction determination section determines that the system malfunction has occurred when a communication malfunction has occurred.

6. The control apparatus according to claim 1, wherein the malfunction determination section determines that the system malfunction has occurred when the vehicle is in a locked state where rotation of the rotary electric machine is locked.

7. The control apparatus according to claim 6, wherein the to-be-avoided state determination section determines that the vehicle is in the to-be-avoided state when the locked state continues for a lock duration time period or more.

8. The control apparatus according to claim 1, wherein the to-be-avoided state determination section determines that the vehicle is in the to-be-avoided state when the vehicle is on an uphill road and a traveling speed of the vehicle is zero.

9. The control apparatus according to claim 1, wherein the to-be-avoided state determination section determines that the vehicle is in the to-be-avoided state when the vehicle is making a high-speed turn.

10. The control apparatus according to claim 1, wherein the to-be-avoided state determination section determines whether or not the vehicle is in the to-be-avoided state on the basis of environmental information acquired from a navigation unit.

* * * * *